United States Patent [19]

Budrow et al.

[11] Patent Number: 5,346,245
[45] Date of Patent: Sep. 13, 1994

[54] PORTABLE TANK WITH EXTENDING HANDLE

[75] Inventors: Jack C. Budrow; Lars E. Eriksson, both of Battle Creek, Mich.

[73] Assignee: Barker Manufacturing Company, Inc., Battle Creek, Mich.

[21] Appl. No.: 104,197

[22] Filed: Aug. 10, 1993

[51] Int. Cl.⁵ .......................... B62B 1/12; B62B 1/16
[52] U.S. Cl. ............................. 280/655; 280/655.1; 280/47.26; 280/47.315; 280/491.2; 220/757; 220/761; 220/767
[58] Field of Search ............... 280/652, 655, 655.1, 280/47.26, 47.315, 47.371, 491.1, 491.2, 37; 220/757, 761, 767, 770, 571, DIG. 6; 16/115, 110.5; 190/18 A

[56] References Cited

U.S. PATENT DOCUMENTS

| | | | |
|---|---|---|---|
| 3,998,476 | 12/1976 | Kazmark, Sr. ................ | 280/655 |
| 4,314,624 | 2/1982 | Royet ........................... | 280/37 X |
| 4,550,813 | 11/1985 | Browning ...................... | 280/37 X |
| 5,139,278 | 8/1992 | Vlasicak ........................ | 280/47.26 |
| 5,197,579 | 3/1993 | Bieber et al. .................. | 280/37 X |
| 5,207,440 | 5/1993 | Liang ........................... | 280/37 X |
| 5,249,438 | 10/1993 | Rhaney et al. ................ | 280/37 X |

FOREIGN PATENT DOCUMENTS

| | | | |
|---|---|---|---|
| 2298977 | 8/1976 | France ........................... | 280/652 |
| 2623447 | 5/1989 | France ......................... | 280/491.2 |

OTHER PUBLICATIONS

Assembly Instructions For Tote-Along 5 Gallon (Part No. 10887) Portable Drain Water Tank, H & H Engineering, 1991.
Tote-Along Tank Instructions TT-10 (10 Gallon), H & H Engineering, 1991, Form 13268, 1991.
Tote-Along Tank Instructions TT-15 (15 Gallon), H & H Engineering, 1991, Form No. 13325, 1991.
Tote-Along Tank Instructions TT-22 (22 Gallon), H & H Engineering, 1991, Form No. 13318, 1991.

*Primary Examiner*—Brian L. Johnson
*Attorney, Agent, or Firm*—Beaman & Beaman

[57] ABSTRACT

A portable tank particularly suitable for handling recreational vehicle liquid waste of relatively large capacity, i.e. 30 gallons, including a receptacle formed of a synthetic plastic material having wheels mounted upon one end of the receptacle and a handle support is molded into the lower region of the receptacle telescopingly receiving an extendable and retractable handle. The outer end of the handle telescopingly receives a handle extension having a grip mounted thereon for manually handling the tank, or attachment to a vehicle trailer hitch.

7 Claims, 1 Drawing Sheet

PORTABLE TANK WITH EXTENDING HANDLE

BACKGROUND OF THE INVENTION

1. Field of the Invention

The invention pertains to portable tanks suitable for receiving liquid waste wherein a relatively large capacity receptacle may be readily manually handled and transported, but is capable of concise storage.

2. Description of the Related Art

Recreational vehicles, such as trailers, motor homes, and the like, normally include built-in liquid waste holding tanks into which sinks, baths and toilets discharge. Such holding tanks require periodic voiding, and such built-in holding tanks require that the vehicle be moved to a septic tank or other discharge location.

It is common to park a recreational vehicle in a single location for weeks, or even months, at a time, and once the vehicle has been parked and situated movement of the vehicle to permit emptying of the holding tank is inconvenient and troublesome.

This problem can be avoided by utilizing a portable liquid waste receiving tank directly connected to the vehicle waste system whereby liquid waste is discharged into the portable receptacle, rather than into the built-in vehicle holding tank. However, such portable tanks are usually of relatively small size and capacity, i.e. 10 to 20 gallons, in view of the necessity of manually transporting the tank to a sewage receiving location. The transportation of such portable waste water tanks is improved by building wheels into the receptacle, and a handle is often molded into the receptacle's synthetic body at a location remote from the wheels to simplify handling. However, even with built-in wheels and handles, a full 20 gallon liquid waste tank will weigh over 160 pounds and the manual handling and transporting of such a portable tank is difficult.

With larger sizes of portable liquid waste receptacles it is known to provide the same with a handle or hitch permitting the hitch to be dropped over a towing vehicle hitch ball whereby the tank may be pulled by the vehicle to the waste discharge location. Such use of a vehicle attachment reduces the effort required to transport the portable tank to the discharge point, but the handling and maneuvering of a full liquid waste tank is difficult.

OBJECTS OF THE INVENTION

It is an object of the invention to provide a portable tank of relatively large capacity capable of receiving liquid waste wherein the receptacle includes wheels and an extendable handle to provide sufficient mechanical advantage to permit relatively large capacity tanks to be manually handled.

Another object of the invention is to provide a portable tank of relatively large capacity which is of a concise storable configuration, and utilizes an extendable handle to provide the necessary mechanical advantage to permit manual handling of a full tank.

Yet another object of the invention is to provide a portable tank suitable for receiving liquid waste wherein the tank is molded of a synthetic plastic material and a tubular handle support is molded into the tank body material for telescopingly receiving a handle displaceable between retracted and extended positions to facilitate concise storage and achieve mechanical advantages during handling.

SUMMARY OF THE INVENTION

A portable tank utilizing the concepts of the invention is particularly suitable for handling liquid waste received from the sewer system of a recreational vehicle. The tank receptacle is preferably formed of a synthetic plastic non-corrodible material having an inlet port removably attachable to the vehicle sewer system. The receptacle includes a pair of wheels mounted upon an axle attached to the tank at one end of the receptacle.

An elongated tubular handle support is molded into the lower region of the receptacle, preferably the bottom, and is open at each end to receive a telescoping elongated handle within the handle support bore. Stops defined upon the handle support and handle engage upon the handle being displaced to its fully extended position, and the handle may be retracted into the handle support to significantly reduce the length of the tank and handle assembly for storage purposes.

The handle, itself, is of a tubular configuration and includes an outer end for receiving a handle extension which may be selectively attached to the handle outer end by a locking pin extending through alignable holes. The handle extension includes a T-bar handle for manual manipulation of the handle extension and associated handle, and also includes a hitch ring capable of being placed over the trailer hitch ball of a towing vehicle.

When the handle is axially displaced within the handle support to its full extended position, and the handle extension attached to the outer end of the handle, the hand grip located on the extension is of sufficient distance from the tank wheels as to provide a relatively high mechanical advantage using the lever principle, and the extended length of the handle and handle extension permits a 240 pound filled receptacle to be readily manipulated and maneuvered by a single individual.

If it is necessary to transport the tank a significant distance to a waste receiving station the handle extension ring may be placed over the ball of a towing vehicle and the portable tank is easily towed and pulled to the discharge location.

Removal of the handle extension from the outer end of the handle by removing the locking pin permits the length of the handle to be significantly reduced, and retracting of the handle into the handle support further reduces the axial dimension of the tank assembly, permitting the tank assembly to be readily stored within a vehicle storage compartment.

The components of the invention may be economically manufactured, and the portable tank made available at a reasonable cost.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
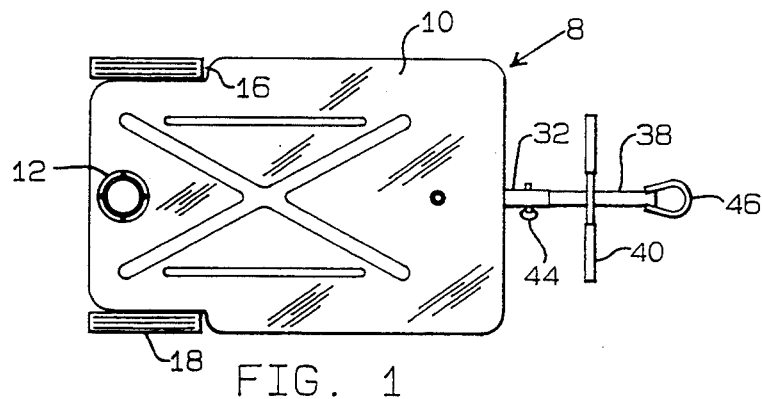
FIG. 1 is a top plan view of a portable tank in accordance with the invention, illustrating the handle in the retracted position, and the handle extension locked within the handle.
Figure 2:
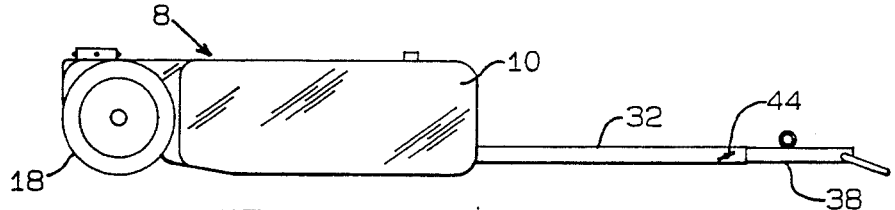
FIG. 2 is a side elevational view of the portable tank illustrating the handle in an extended condition, and the handle extension attached to the handle outer end.

As will be appreciated from FIGS. 1 and 2, a portable tank 8 in accordance with the invention utilizes a receptacle 10 preferably molded of a synthetic plastic material. The inventive concepts of the invention are of particular advantage when the capacity of the receptacle 10 is relatively large, i.e. approximately 30 gallons, wherein a liquid waste material weighing approximately 240 pounds could be accommodated if the receptacle is filled. Filling of the receptacle is achieved through the opening 12, through which the receptacle may also be emptied, and the outlet 12 includes threads or other connections whereby a hose, not shown, may be attached thereto. The receptacle also includes a vent 14 to vent the receptacle during emptying.

The receptacle 10 includes a rear end which is recessed at 16 to accommodate wheels 18 mounted upon an axle, not shown, which snaps into a transversely disposed slot formed in the receptacle. As will be appreciated from FIGS. 2 and 6, the wheels 18 are of such a configuration as to substantially correspond to the vertical height of the receptacle 10, but the configuration of the receptacle is such that when the receptacle is tilted as in FIG. 6 the wheels 18 will rest upon the ground and permit the receptacle to be supported by the wheels.

Figure 3:
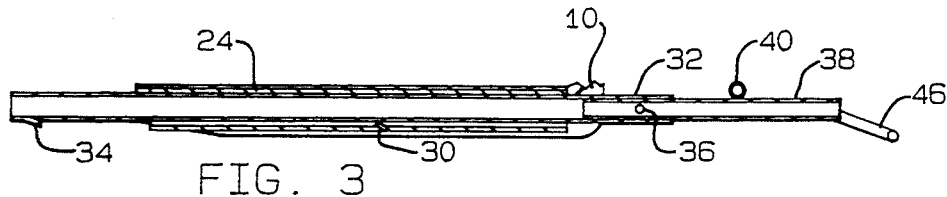
FIG. 3 is an enlarged detail elevational sectional view illustrating the relationship of the handle support, handle and handle extension when the handle is in its retracted position.
Figure 4:
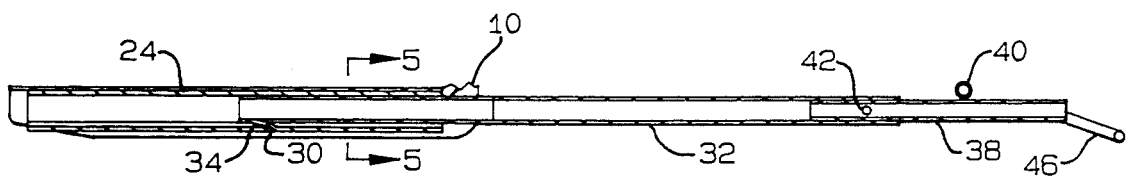
FIG. 4 is an enlarged detail elevational sectional view similar to FIG. 3, illustrating the handle in its extended position with respect to the handle support.
Figure 5:
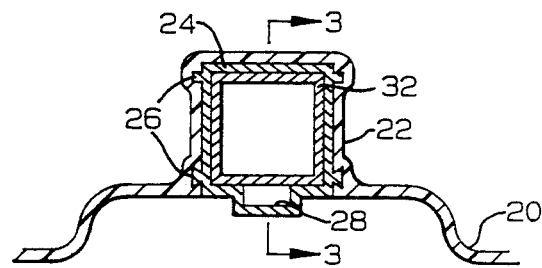
FIG. 5 is an enlarged elevational sectional view taken along section 5—5 of FIG. 4.

The lower surface of the receptacle 10 is represented at 20, FIG. 5, and an elongated box shape 22 is molded into the lower surface or lower region of the receptacle 10 having the configuration apparent from FIG. 5. The shape 22 encompasses a metal box beam 24 of an elongated configuration as will be appreciated from FIG. 3, and the box beam 24 is usually formed of extruded aluminum. The box beam 24 includes outwardly extending anchors 26, some of which may have a dovetail configuration, FIG. 5, to aid in the mechanical interconnection between the box beam and the shape 22. The beam 24 includes a lower recess 28, and an upwardly extending locking abutment 30 is defined from the material of the lower portion of the recess 28 at the central region of the beam 24, as will be appreciated from FIGS. 3 and 4. The abutment 30 is formed by lancing material from the recess producing an abutment surface facing toward the left, FIG. 3, for cooperating with a stop formed on the handle, as later described.

An elongated tubular handle 32 is telescopingly received within the box beam 24 for axial movement therein. As will be appreciated from FIG. 5, the box beam 24 is of a substantially square transverse cross sectional shape, as is the handle 32. A stop 34 is lanced from the lower portion of the handle 32 adjacent its inner or left end, FIG. 3, and the stop 34 is received within the recess 28 and will engage the abutment 30 when the handle 32 is moved to the right to its fully extended position as shown in FIGS. 2, 4 and 6.

The handle 32 is provided with aligned holes 36 at its outer end for receiving a locking pin as described below.

A tubular handle extension 38 is telescopingly received within the outer end of the handle 32, and the handle extension 38 includes a T-bar hand grip 40 having hand grips defined thereon for permitting manual handling of the tank 8. A pair of holes 42 are defined in the inner end of the handle extension 38, and upon the holes 42 being aligned with the handle holes 36, the locking pin 44 may be inserted through the aligned holes to lock the handle extension 38 within the handle 32.

Figure 6:
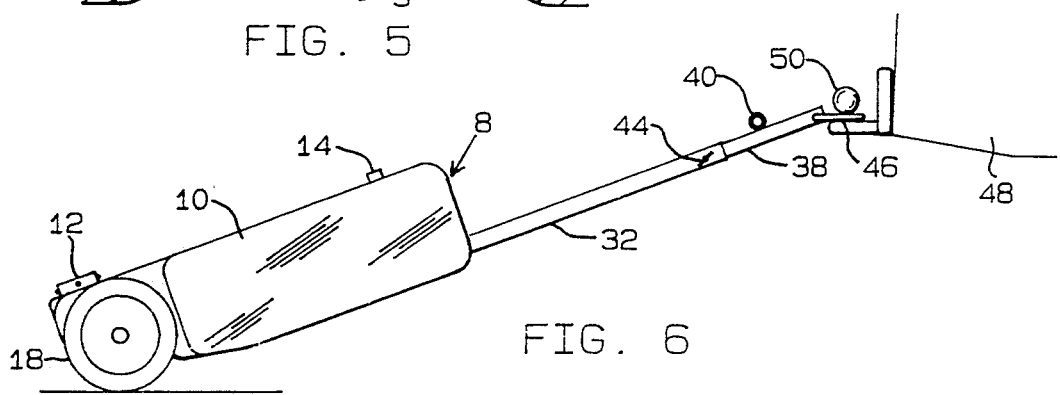
FIG. 6 is a side elevational view illustrating a portable tank in accord with the invention with the handle in the extended position, and the handle extension ring placed over the trailer hitch ball of a towing vehicle.

At its outer end, the handle extension 38 includes a ring 46 of such diameter as to slip over a trailer hitch ball 50 mounted a towing vehicle 48, FIG. 6.

A portable tank 8 in accord with the inventive concepts is most widely used with recreational vehicles wherein it is desired to drain the vehicle sewage system into a portable tank, rather than the built-in vehicle holding tank. Accordingly, the tank assembly will normally be stowed within a vehicle compartment or locker, and it is desired that the assembly occupy as little space as possible. To this end, the locking pin 44 is removed from the holes 36 and 42, and the handle extension 38 removed from the handle 32. Thereupon, the handle 32 can be axially displaced toward the receptacle 10 within the box beam 24 to shift the handle to its retracted position as shown in FIGS. 1 and 3. In this position, the overall length of the tank assembly will be minimized.

When it is desired to move the portable tank assembly, the handle extension 38 is inserted into the outer end of the handle 32 until the holes 36 and 42 align, the locking pin 44 is inserted, and the handle 32 is extended to its extended position as shown in FIGS. 2, 4 and 6 wherein the stop abutments 30 and 34 engage, as shown in FIG. 4. With the handle 32 fully extended, sufficient mechanical advantage is achieved upon gripping the hand grip 40 to permit even a full 30 gallon receptacle 10 to be maneuvered as desired, and if it is necessary to convey the tank assembly a significant distance to a discharge point, the ring 46 may be slipped over the ball hitch 50 of the vehicle 48 and the assembly pulled to the sewage discharge location as shown in FIG. 6.

It is appreciated that various modifications to the inventive concepts may be apparent to those skilled in the art without departing from the spirit and scope of the invention.

We claim:

1. A portable tank for fluids comprising, in combination, a receptacle formed of a molded synthetic plastic having a port, an upper portion, a lower portion, a front end, a rear end and a longitudinal axis, a pair of wheels rotatably mounted on said receptacle adjacent said rear end, a metal elongated tubular handle support molded into said receptacle lower portion during the molding thereof substantially parallel to said longitudinal axis having an inner bore, anchors defined on said tubular handle support embedded into the material of said receptacle, a tubular handle telescopingly received within said handle support bore and axially displaceable therein between retracted and extended positions, stop means mounted on said tubular handle support limiting extension of said handle therein at said extended position, said handle having an outer end, a handle extension mounted on said handle outer end, and a hand grip defined on said handle extension.

2. In a portable tank as in claim 1, said stop means comprising a first abutment defined on said tubular handle support, a second abutment defined on said handle, said abutments engaging at said handle extended position.

3. In a portable tank as in claim 2, said first and second abutments comprising lancings displaced from said tubular handle support and handle, respectively.

4. In a portable tank as in claim 1, means removably mounting said handle extension on said handle outer end.

5. In a portable tank as in claim 4, said handle extension being telescopingly received within said tubular handle, said means removably mounting said handle extension on said handle outer end comprising alignable holes defined in said handle and handle extension, and a locking pin selectively received within said holes to removably attach said handle extension to said handle.

6. In a portable tank as in claim 5, said hand grip including a manually grippable T-bar affixed to said handle extension.

7. In a portable tank as in claim 5, a ring affixed to said handle extension for receiving a hitch ball.

* * * * *